US009705683B2

(12) United States Patent
Vanstone

(10) Patent No.: US 9,705,683 B2
(45) Date of Patent: Jul. 11, 2017

(54) VERIFIABLE IMPLICIT CERTIFICATES

(71) Applicants: Trustpoint Innovation Technologies Ltd., Campbellville (CA); Sherry Vanstone, Campbellville (CA)

(72) Inventor: Scott A. Vanstone, Campbellville (CA)

(73) Assignee: ETAS Embedded Systems Canada Inc., Waterloo (CA)

( * ) Notice: Subject to any disclaimer, the term of this patent is extended or adjusted under 35 U.S.C. 154(b) by 309 days.

(21) Appl. No.: 14/677,442

(22) Filed: Apr. 2, 2015

(65) Prior Publication Data
US 2015/0288527 A1    Oct. 8, 2015

Related U.S. Application Data

(60) Provisional application No. 61/975,284, filed on Apr. 4, 2014.

(51) Int. Cl.
| H04L 29/06 | (2006.01) |
| H04L 9/32 | (2006.01) |
| H04L 9/30 | (2006.01) |
| H04L 9/08 | (2006.01) |

(52) U.S. Cl.
CPC .......... H04L 9/3268 (2013.01); H04L 9/0844 (2013.01); H04L 9/3066 (2013.01)

(58) Field of Classification Search
None
See application file for complete search history.

(56) References Cited

U.S. PATENT DOCUMENTS 6,792,530 B1    9/2004  Qu et al.
8,341,401 B1 *  12/2012 Kaufman ............. H04L 63/205
                                                             713/155

(Continued)

OTHER PUBLICATIONS

Yang, Haomin; Zhang, Yaoxue; Zhou, Yuezhi. A Two-Party Identity-Based Key Agreement Protocol with Explicit Authentication. 2012 8th International Conference on Wireless Communications, Networking and Mobile Computing (WiCOM). http://ieeexplore.ieee.org/stamp/stamp.jsp?arnumber=6478381.*

(Continued)

*Primary Examiner* — Jeremiah Avery
(74) *Attorney, Agent, or Firm* — Brett J. Slaney; Blake, Cassels & Graydon LLP

(57) ABSTRACT

An implicit certificate cryptosystem uses an implicit certificate that includes a pair of certificate components. One of the certificate components includes a public key reconstruction data that is the combination of ephemeral public keys of two entities, one of which is a trusted entity and the other of which is associated with the implicit certificate. The public key reconstruction data is then combined with the identity of the other entity and the combination encrypted to form a first certificate component. A second certificate component is generated by using the first certificate component as a message in a signature scheme and generating a signature of the trusted entity on the message. The two certificate components are provided to the other entity to permit the other entity to generate a private key using one of the certificate components. The corresponding public key can be derived from the remaining certificate component.

20 Claims, 3 Drawing Sheets

(56) References Cited

U.S. PATENT DOCUMENTS

| | | | | |
|---|---|---|---|---|
| 8,713,321 B2* | 4/2014 | Brown | .................. | H04L 9/3066 380/278 |
| 2006/0153365 A1* | 7/2006 | Beeson | ................ | H04L 9/3066 380/30 |
| 2006/0156012 A1* | 7/2006 | Beeson | ................ | H04L 9/3226 713/180 |
| 2007/0064932 A1* | 3/2007 | Struik | ..................... | G06F 7/725 380/30 |
| 2009/0210712 A1* | 8/2009 | Fort | ................... | H04L 63/1441 713/175 |
| 2010/0023771 A1* | 1/2010 | Struik | ..................... | H04L 9/002 713/171 |
| 2011/0010770 A1* | 1/2011 | Smith | ..................... | G06F 21/71 726/18 |
| 2011/0194694 A1* | 8/2011 | Struik | .................. | H04L 9/3252 380/255 |
| 2012/0102334 A1* | 4/2012 | O'Loughlin | ............ | G06F 21/57 713/189 |
| 2013/0236019 A1* | 9/2013 | Zaverucha | ............ | H04L 9/3263 380/278 |
| 2014/0108786 A1* | 4/2014 | Kreft | ...................... | G06F 21/71 713/156 |

OTHER PUBLICATIONS

Porambage, Pawani; Kumar, Pardeep; Schmitt, Corinna; Gurtov, Andrei; Ylianttila, Mika. Certificate-Based Pairwise Key Establishment Protocol for Wireless Sensor Networks. 2013 IEEE 16th International Conference on Computational Science and Engineering (CSE). http://ieeexplore.ieee.org/stamp/stamp.jsp?arnumber=6755283.*

Yuan, Wei; Hu, Liang; Zhao, Kuo; Li, Hong-tu; Chu, Jian-feng; Sun, Yuyu. Improvement of an Efficient Identity-Based Group Key Agreement Protocol. 2011 International Conference on Network Computing and Information Security (NCIS). http://ieeexplore.ieee.org/stamp/stamp.jsp?arnumber=5948723.*

* cited by examiner

VERIFIABLE IMPLICIT CERTIFICATES

CROSS-REFERENCE TO RELATED APPLICATIONS

This application claims priority to U.S. Provisional Patent Application No. 61/975,284 filed on Apr. 4, 2014 and the entire contents of which are incorporated herein by reference.

FIELD OF THE INVENTION

The present invention relates to data communication systems and protocols utilized in such systems.

BACKGROUND OF THE INVENTION

Data communication systems are used to exchange information between devices. The information to be exchanged comprises data that is organized as strings of digital bits formatted so as to be recognizable by other devices and to permit the information to be processed and/or recovered.

The exchange of information may occur over a publically accessible network, such as a communication link between two devices, or over a dedicated network within an organization, or may be between two devices within the same dedicated component, such as within a computer or point of sale device.

The devices may be relatively large computer systems, telecommunication devices, cellular phones, monitoring devices, sensors, electronic wallets and smart cards, and a wide variety of devices that are connected to transfer data between two or more of such devices. A large number of communication protocols have been developed to allow the exchange of data between different devices. The communication protocols permit the exchange of data in a robust manner, often with error correction and error detection functionality, and for the data to be directed to the intended recipient and recovered for further use.

Because the data may be accessible to other devices, it is vulnerable to interception and/or manipulation. The sensitive nature of the information requires that steps are taken to secure the information and ensure its integrity.

A number of techniques, collectively referred to as encryption protocols, have been developed to provide the required attributes and ensure security and/or integrity in the exchange of information. These techniques utilize a key that is combined with the data.

There are two main types of cryptosystems that implement the protocols, symmetric key cryptosystems and asymmetric or public key cryptosystems. In a symmetric key cryptosystem, the devices exchanging information share a common key that is known only to the devices intended to share the information. Symmetric key systems have the advantage that they are relatively fast and therefore able to process large quantities of data in a relatively short time, even with limited computing power. However, the keys must be distributed in a secure manner to the different devices, which leads to increased overhead and vulnerability if the key is compromised.

A symmetric or public key cryptosystems utilize a key pair, one of which is public and the other private, associated with each device. The public key and private key are related by a "hard" mathematical problem so that even if the public key and the underlying problem are known, the private key cannot be recovered in a feasible time. One such problem is the factoring of the product of two large primes, as utilized in RSA cryptosystems. Another is the discrete log problem in a finite cyclic group. A generator, $\alpha$, of the underlying group is identified as a system parameter and a random integer, k, generated for use as a private key. To obtain a public key, K, a k-fold group operation is performed so that $K=f(\alpha,k)$.

Different groups may be used in discrete log cryptosystems including the multiplicative group of integers modulus a prime, usually denoted Zp* and consisting of the integers to p-1. The group operation is multiplication so that $K=f(\alpha^k)$.

Another group that is used for enhanced security is an elliptic curve group. The elliptic curve group consists of pairs of elements, one of which is designated x and the other y, in a group of order n that satisfy the relationship $y^2$ mod $p=x^3+ax+b$ mod p. Each such pair of elements is a point on the curve, and a generator of the group is designated as a point P. The group operation is addition, so a private key k will have a corresponding public key f(kP), which is itself a point resulting from a k-fold group operation on the base point P and represented as a pair of bit strings, each of which is an element of the underlying field.

Public key cryptosystems reduce the infrastructure necessary with symmetric key cryptosystems. A device may generate an integer k, and generate the corresponding public key kP. The public key is published so it is available to other devices. The device may then use a suitable signature protocol to sign a message using the private key k and other devices can confirm the integrity of the message using the public key kP.

Similarly, a device may encrypt a message to be sent to another device using the other device's public key, which can then be recovered by the other device using the private key. However, these protocols are computationally intensive, and therefore relatively slow, compared with symmetric cryptosystem protocols.

Public key cryptosystems may also be used to establish a key that is shared between two devices. In its simplest form, as proposed by Diffie-Hellman, each device sends a public key to the other device. Both devices then combine the received public key with their private key to obtain a shared key.

One device, usually referred to as an entity, Alice, generates a private key $k_a$ and sends another device, or entity, Bob, the public key $k_aP$.

Bob generates a private key kb and sends Alice the public key kbP

Alice computes $k_a.k_bP$ and Bob computes $k_b.k_aP$ so they share a common key $K=k_a.k_bP=k_b.k_aP$. The shared key may then be used in a symmetric key protocol. Neither Alice nor Bob may recover the private key of the other, and third parties cannot reconstruct the shared key.

The protocols that have been developed require the use of a public key of another party. In order to validate the public key as that of the intended entity, a trusted hierarchy has been established in which a trusted entity, referred to as the Certification Authority or CA, validates the public key of entities within its domain. Each entity will have the public key of the CA embedded and uses that public key to validate the public key of the individual entities.

The usual form of validation requires the CA to generate a certificate that is the CA's signature of a message that includes the public key of the entity. An entity that wishes to use another entity's public key can then verify the certificate using the CA's public key and extract from the message the public key of the other entity. Such a protocol can however be computationally and bandwidth intensive.

An alternative protocol uses implicitly certified public keys in which the public key of an entity is reconstructed by the user, rather than transported as a public key certificate. One widely accepted key agreement scheme utilizing implicit certificates is described in U.S. Pat. No. 6,792,530. In its simplest form, an implicitly certified public key of an entity A is provided from a unique identity, $ID_A$, and public key reconstruction data, $\gamma_A$, that is generated by a trusted authority and associated with the entity A. The pair $ID_A, \gamma_A$ are the implicit certificate of the public key of A and can be used with published public information to reconstruct the ephemeral public key. Thus, in the first example provided in U.S. Pat. No. 6,792,530, the trusted authority CA chooses a random number c, and computes a corresponding public value β, where $β = α^c$ mod p and α is a generator of the finite field. CA chooses a second random number $c_a$ and computes $\gamma_A$ as $α^{c_a}$ mod p. A value f is computed as a function $F(I_A, \gamma_A)$ and a private key "a" derived from the relationship $1 = cf + c_a a$ (mod n). The values $\gamma_A$, $I_A$ and a are then sent to the entity A. This requires a secure channel as the private key is being transferred. The selection of the random numbers is also entirely the responsibility of the CA, who will also have knowledge of the private key a.

In subsequent embodiments described in U.S. Pat. No. 6,792,530, the entity A participates in the selection of the random numbers and a secure channel is avoided through the use of a shared key to encrypt a component used to generate the private key of the entity A. However, the identity $ID_A$ and public key reconstruction data $\gamma_A$ are sent in the clear, leaving them vulnerable to inadvertent and/or malicious modification.

It is therefore an object of the present invention to provide an implicitly certified public key scheme in which the above disadvantages are obviated or mitigated.

SUMMARY OF THE INVENTION

In general terms, the protocol enables a trusted entity to establish a public key reconstruction data for another entity by combining ephemeral public keys of each party. The public key reconstruction data is then combined with the identity of the other party and the combination encrypted to form a first certificate component. A second certificate component is generated by using the first certificate component as a message in a signature scheme and generating a signature of the trusted entity on the message. The two certificate components are provided to the other entity to permit the other entity to generate a private key using one of the certificate components. The corresponding public key can be derived from the remaining certificate component.

Preferably, the certificate components are used as inputs to a signature verification protocol to verify the integrity of the certificate components.

Preferably also the protocol is implemented in an elliptic curve cryptosystem and the combination of the public keys is performed by point addition.

BRIEF DESCRIPTION OF THE DRAWINGS

An embodiment of the present invention will now be described by way of example only with reference to the accompanying drawings, in which:

FIG. 3, comprising

DETAILED DESCRIPTION OF THE INVENTION

The protocol described below has been described in the setting of the group of points on an elliptic curve defined over a finite field. However, it can be easily modified to work in any finite group in which the discrete logarithm problem appears intractable. Suitable choices include the multiplicative group of a finite field, subgroups of $Z^*_n$, where n is a composite integer, and subgroups of $Z^*_p$ of prime order q. Elliptic curve groups are advantageous because they offer equivalent security as the other groups but with smaller key sizes and faster computation times.

Figure 1:
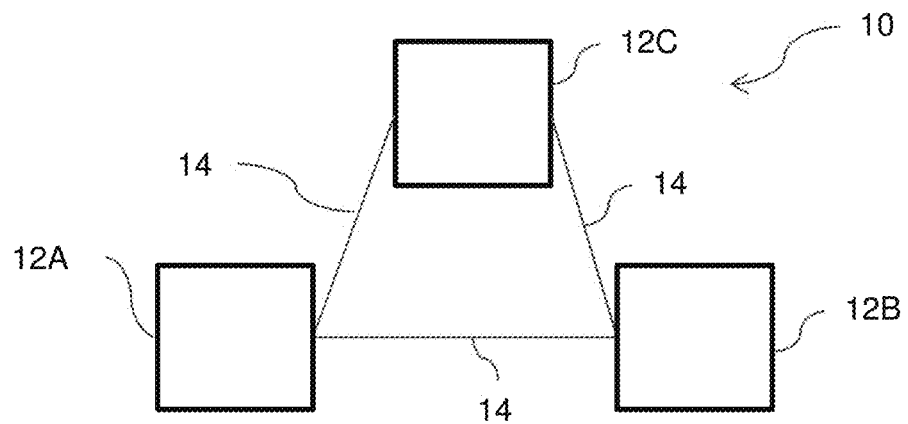
FIG. 1 is a schematic representation of a data communication system.

Referring therefore to FIG. 1, a data communication system 10 includes a plurality of devices 12 interconnected by communication links 14. The devices 12 may be of any known type including a computer, a server, a cellphone, ATM, and smart card. The communication links 14 may be conventional fixed telephone lines, wireless connections implemented between the devices 12, near field communication connections such as Bluetooth or other conventional form of communication.

The devices 12 will differ according to their intended purpose, but, typically, will include a communication module 20 (FIG. 2) for communication to the links 14. A memory 22 provides a storage medium for non-transient instructions to implement protocols and to store data as required. A secure memory module 24, which may be part of memory 22 or may be a separate module, is used to store private information, such as the private keys used in the encryption protocols and withstand tampering with that data. An arithmetic logic unit (ALU) 26 is provided to perform the arithmetic operations instruction by the memory 22 using data stored in the memories 22, 24. A random or pseudo random number generator 28 is also incorporated to generate bit strings representing random numbers in a cryptographically secure manner.

Figure 2:
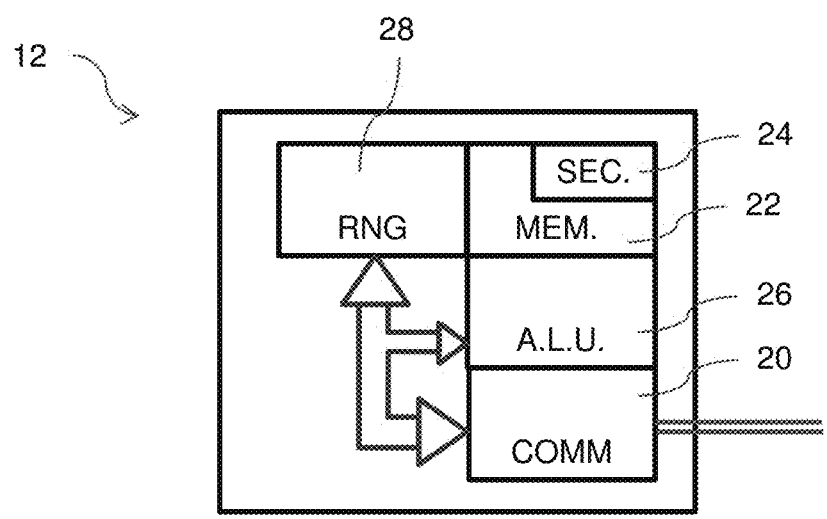
FIG. 2 is a representation of a device used in the data communication system of FIG. 1.

It will be appreciated that the device 12 illustrated in FIG. 2, is highly schematic and representative of a conventional device used in a data communication system.

The memory 22 stores system parameters for the cryptosystem to be implemented and a set of computer readable instructions to implement the required protocol. In the case of an elliptic curve cryptosystem, elliptic curve domain parameters consist of six quantities q, a, b, P, n, and h, which are:

The field size q.
The elliptic curve coefficients a and b.
The base point generator P.
The order n of the base point generator.
The cofactor h, which is the number such that hn is the number of points on the elliptic curve.

The parameters will be represented as bit strings, and the representation of the base point P is a pair of bit strings, each representing an element of the underlying field. As is conventional, one of those strings may be truncated as the full representation may be recovered from the other co-ordinate and the truncated representation.

The secure memory module 24 contains a bit string representing a long term private key d, and the corresponding public key Q. For an elliptic curve cryptosystem, the key Q=dP, which is a point on the curve with the coordinates of the points a pair of bit strings (x,y) each of which is an element of the underlying field.

Secure memory 24 will also include an identification ID of the device 12. Conveniently this will be a certificate issued by a trusted authority to permit third party verification of the identity. A convenient form of certificate is an ECQV certificate, as set out in the SEC 4 standard. The identity ID may also include information to facilitate computation at the recipient of the identity, such as point multiples of the base point P to reduce computation.

Ephemeral values computed by the ALU may also be stored within the secure module 24 if their value is intended to be secret.

The devices 12 are organized in a hierarchy of trust, so that the devices 12A, 12B each trust the device 12C and accept certificates issued by the device 12C. The trusted device 12C is usually referred to as the certification authority, or CA. Each of the devices 12A, 12B has a copy of the public key of the CA 12C in its memory 24 so that messages signed by the CA 12C can be verified at each of the devices 12A, 12B using the public key of the CA. The CA 12C is itself in a trusted hierarchal relationship with another CA so that messages may pass in a trusted manner through the network.

Figure 3A:
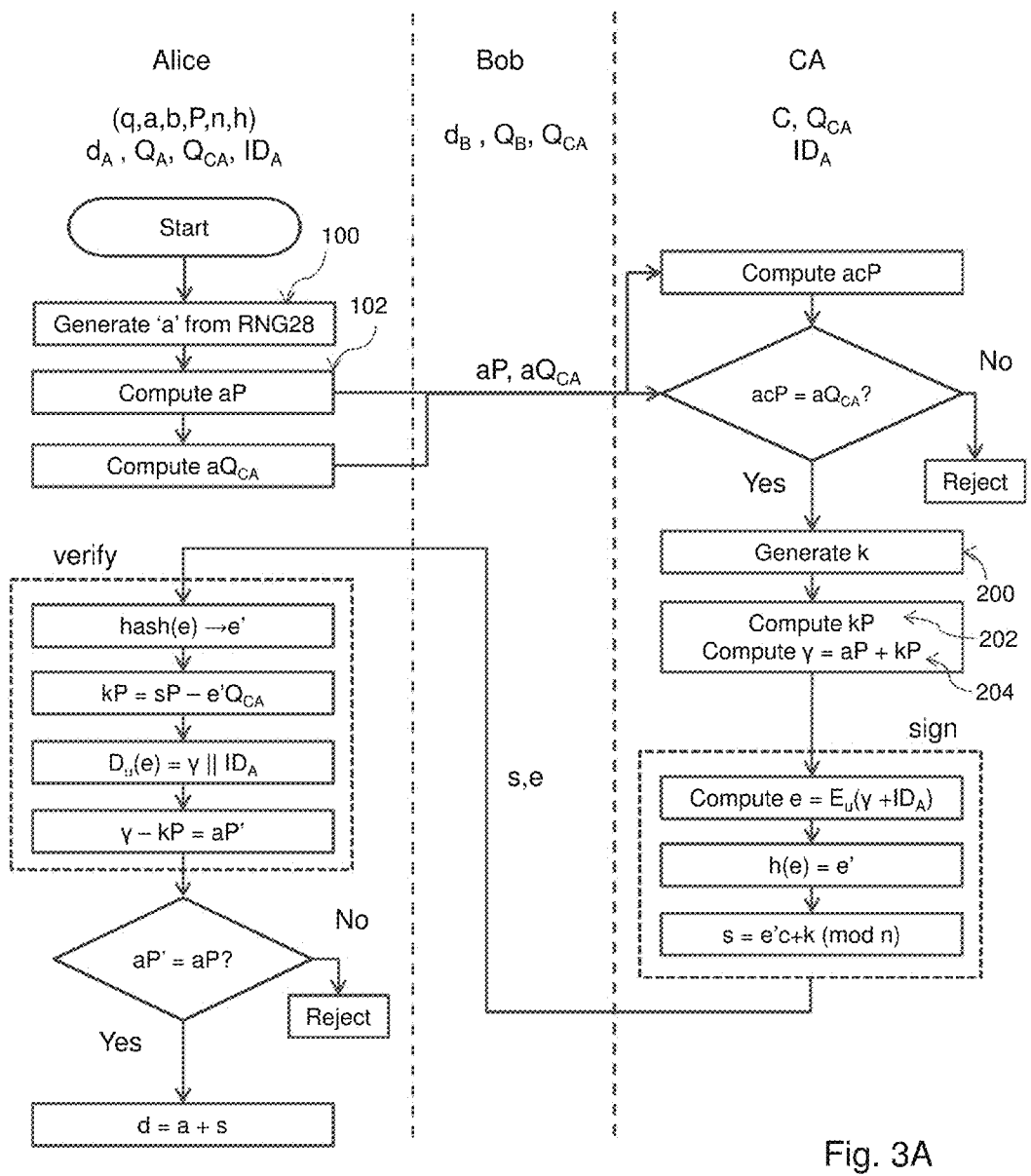
FIGS. 3A and 3B, is a flow chart showing a protocol implemented between a pair of devices shown in FIG. 1.
Figure 3B:
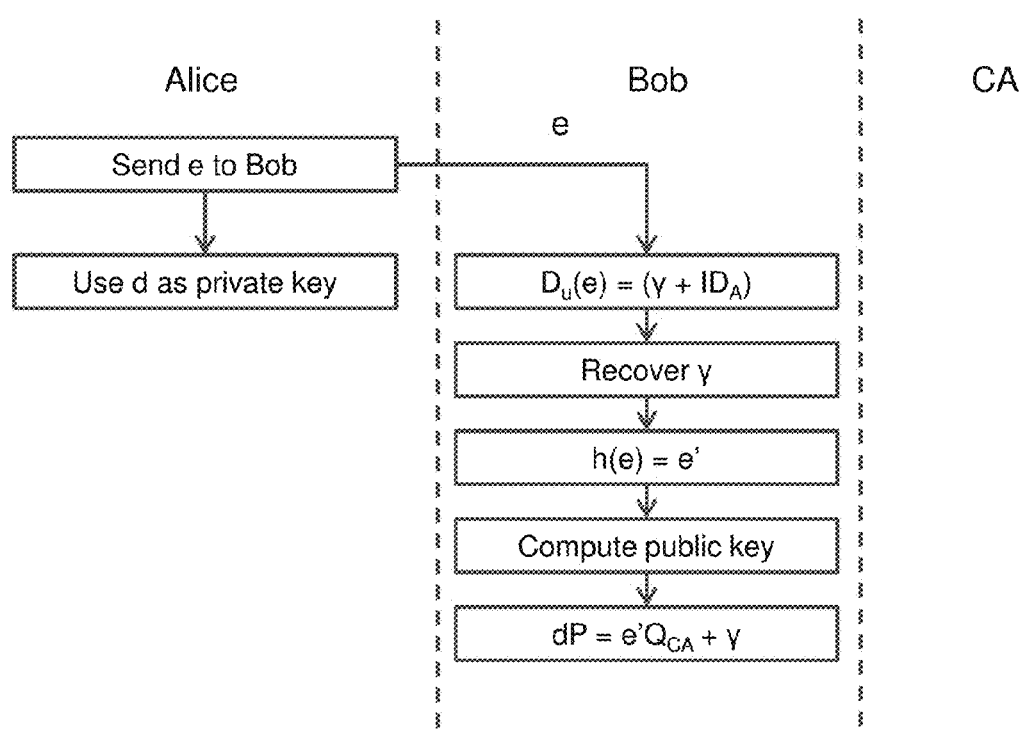

The implicit certificate protocol is shown in FIG. 3, through which one of the devices acquires an implicit certificate to allow other devices to reconstruct a public key used by the one device in performing a cryptographic function. To facilitate the description of the protocol, the devices are conventionally referred to as the entity Alice and the entity Bob. Values associated with Alice will be denoted by the suffix A and those of Bob by the suffix B. Alice has a long term private key $d_A$ and corresponding public key $Q_A$ stored in the secure memory module 24. Similarly Bob has a private key $d_B$ and corresponding public key $Q_B$ stored in his secure memory module 24. As noted above, Alice and Bob each have an authentic copy of the public key $Q_{CA}$ of the certification authority 12C.

Alice wants to communicate with Bob and requires an ephemeral public key that can be used by Bob. Alice therefore implements through the instructions stored in the memory 22 the protocol shown in FIG. 3.

At 100, Alice generates a random integer using the RNG 28 and stores an integer value a as session private key in the secure module 24. Alice's ALU 26 computes, at 102, a corresponding session public key aP which she sends over a communication link 16 to the trusted device 12C acting as the CA. The session public key aP is a representation of a point on the underlying elliptic curve and has a pair of bit strings, each representing an element in the underlying field. Point compression techniques may be used if preferred to reduce the bandwidth, so that only one element is sent together with an identifier from which the other element may be derived.

The CA 12C initially wishes to confirm that Alice is in possession of the private key "a" used to generate the public key aP, and so initiates a proof of possession (POP) protocol with Alice. The POP protocol may be of any convenient form as is well known in the cryptographic art, but in its simplest form requires Alice to generate a shared key from the private key a and the public key $Q_{CA}$ of the CA. The CA's public key $Q_{CA}$ has a corresponding private key c so that $Q_{CA}$ corresponds to the point cP. Alice computes $aQ_{CA}=acP$ and sends this to the CA 12C. The CA has possession of the private key c corresponding to the public key $Q_{CA}$ and so computes c.aP and compares the value obtained to that received from Alice. If they are the same, Alice's POP is established.

The CA 12C generates, at 200, a random integer k with his RNG 28 which he stores in his secure module 24. A corresponding point kP is computed at 202 and stored.

The CA combines the ephemeral public keys of the CA and Alice by performing a point addition using the ALU 26 to compute $\gamma=aP+kP$, as shown at 204. This will in turn be a further point, $\gamma$, on the curve, and thus represented as a pair of elements. The value $\gamma$ will act as the public key reconstruction data for the ephemeral public key to be used by Alice and has contributions from both Alice and the CA and thus binds the two entities to the value.

The CA 12C then concatenates the public key reconstruction data $\gamma$ and the identity $ID_A$ of the device 12A to form a bit string and encrypts the bit string using a key derived from public information. Preferably, as the base point P is represented by a pair of field elements (u,v) and is known to entities in the same security domain, the CA 12C uses the element u as an encryption key to compute a value $e=E_u(\gamma+ID_A)$ where $E_u$ represents an encryption function E using the element u as a key. The value e provides a first certificate component and is used in subsequent steps as an input corresponding to a message in a public key signature scheme.

In the example provided, a signature scheme generally conforming to the structure of a Schorr signature protocol is used with the value e serving as the message to be signed.

The first certificate component e is hashed using a cryptographically secure hash function, such as SHA1 or SHA2, and obtain a bit string that is then converted to an integer e'.

A second certificate component, s, is then generated by the ALU computing $s=e'c+k \pmod{n}$, which combines the private keys of the CA, the public keys of the CA and Alice and the ID of Alice. The components s,e are then sent to Alice. The pair s,e are the implicit certificate of an ephemeral public key corresponding to a private key to be generated by Alice.

Alice initially uses a verification protocol to determine the integrity of the certificate components. As Alice knows the system parameter P and the public key $Q_{CA}$ of the CA 12C, she can hash the value e to obtain e' and compute a value of kP from $sP-e'Q_{CA}$. To authenticate the information received, Alice decrypts the value e using the key u to recover the concatenation of $\gamma$ and IDA and extract $\gamma$. Using the recovered value of kP, Alice calculates $\gamma-kP$ to obtain aP' which should equal aP. By comparing the value of aP Alice initially generated with the recovered value, the integrity of the message is verified.

If it does not, the information is rejected, but if the values are identical Alice continues to generate an ephemeral private key $d=a+s$, using the certificate component s. The corresponding public key dP corresponds to (a+s)P and can be computed as $e'Q_{CA}+\gamma$ Bob, the device 12B, may therefore generate the ephemeral public key of Alice by receiving the value e either from Alice or from the CA 12C and using e to compute e' and to recovering $\gamma$ using the key u.

The signature performed by the CA allows Alice to verify the integrity of the certificate components and identify any tampering. It will also be noted that one of the signature components, s, is used to provide a new private key by coupling it with the ephemeral private key "a", which is maintained private at all times by Alice.

What is claimed:

1. A method of generating an implicit digital certificate for use in a public key cryptosystem, said method comprising:
   combining session public keys of two electronic entities to generate public key reconstruction data for one of the electronic entities;
   combining the public key reconstruction data with an identity of said one of the electronic entities and encrypting the combination to generate a first digital certificate component;
   generating a second digital certificate component by using the first digital certificate component as an input corresponding to a message in a digital signature scheme, and generating a digital signature on the message, said first digital certificate component and said second digital certificate component constituting an implicit digital certificate for the one electronic entity, whereby an ephemeral private key is derivable for the one of the electronic entities using one of the first and second digital certificate components in a manner that permits the corresponding ephemeral public key to be derived from the remaining certificate component; and
   sending at least one of the implicit digital certificate components over a communication link to be used in subsequent communications in the public key cryptosystem.

2. The method of claim 1 wherein said certificate components are used as inputs to a signature verification protocol to verify the integrity of the certificate components.

3. The method of claim 1 wherein said first signature component is combined with publically available information to obtain said corresponding ephemeral public key.

4. The method of claim 3 wherein said public information includes said public key reconstruction data and a public key.

5. The method of claim 4 wherein said public key is a public key of a trusted entity.

6. The method of claim 1 wherein said second certificate component is combined with a session private key corresponding to one of said session public keys to obtain said ephemeral private key.

7. The method of claim 1 wherein said combination of public key reconstruction data and the identity of the other entity is encrypted using a key obtained from a generator of a group used in the public key cryptosystem.

8. The method of claim 7 wherein said group is an elliptic curve group and said key is derived from one of the co-ordinates of the base point generator of the group.

9. The method of claim 7 wherein the combination of the ephemeral public keys is performed by point addition.

10. The method of claim 1 wherein said first certificate component and said second certificate component are generated by the same entity.

11. The method of claim 10 wherein said entity is a trusted entity.

12. The method of claim 11 wherein said signature is generated using a long term private key of said trusted entity.

13. The method of claim 12 wherein the verification of said signature is performed by said one entity using a long term public key of said trusted entity corresponding to said long term private key.

14. A method of computing an ephemeral private key bar one electronic entity to be used in a public key cryptosystem, the method comprising:
   receiving an implicit digital certificate via a communication link, the implicit digital certificate comprising: (i) a first digital certificate component generated by combining session public keys of said one electronic entity and another electronic entity to generate public key reconstruction data, combining the public key reconstruction data with an identity of said one electronic entity, and encrypting the combination, and (ii) a second digital certificate component generated by using the first digital certificate component as an input corresponding to a message in a digital signature scheme and generating a digital signature on the message; and
   generating the ephemeral private key for use in communicating in the public key cryptosystem by combining said second digital certificate component and a session private key corresponding to the session public key of the one entity.

15. The method of claim 14 further comprising verifying implicit signature components in the digital signature scheme using said first certificate component and said second certificate component as inputs to a signature verification protocol.

16. A method of computing an ephemeral public key to be used in a public key cryptosystem, the method comprising:
   receiving a first digital certificate component of a pair of digital certificate components corresponding to an implicit digital certificate via a communication link, the first digital certificate component having been generated by combining session public keys of a pair of electronic entities to generate public key reconstruction data, combining the public key reconstruction data with an identity of one of the electronic entities, and encrypting the combination, wherein the implicit digital certificate comprises a second digital signature component generated by using the first digital certificate component as an input corresponding to a message in a digital signature scheme and generating a digital signature on the message, wherein an ephemeral private key corresponding to the ephemeral public key is derivable using the implicit digital certificate;
   recovering said public key reconstruction data from said first digital certificate component; and
   combining a value derived from said first certificate component, public information of the other of said pair of electronic entities and said public key reconstruction data to generate said ephemeral public key.

17. The method of claim 16 wherein said other entity is a trusted entity.

18. The method of claim 16 wherein generation of said first digital certificate component includes encrypting a combination of the public key reconstruction data and said public information of the other of said pair of electronic entities, and computing said ephemeral public key comprises decrypting the first digital certificate component prior to recovering said public key reconstruction data.

19. A non-transitory computer readable medium comprising computer executable instructions for establishing an implicit certificate for use in a public key cryptosystem, said computer readable medium comprising instructions for:
   combining session public keys of two electronic entities to generate public key reconstruction data for one of the electronic entities;
   combining the public key reconstruction data with an identity of said one of the electronic entities and encrypting the combination to generate a first digital certificate component;
   generating a second digital certificate component by using the first digital certificate component as an input corresponding to a message in a digital signature scheme, and generating a digital signature on the message, said first digital certificate component and said second digital certificate component constituting an implicit digital certificate for the one electronic entity, whereby an ephemeral private key is derivable for the one of the electronic entities using one of the first and second digital certificate components in a manner that permits the corresponding ephemeral public key to be derived from the remaining certificate component; and sending at least one of the implicit digital certificate components over a communication link to be used in subsequent communications in the public key cryptosystem.

20. The non-transitory computer readable medium of claim 19, wherein said first certificate component and said second certificate component are generated by the same trusted entity.

\* \* \* \* \*